United States Patent [19]

Bartholomew

[11] Patent Number: 4,946,275
[45] Date of Patent: Aug. 7, 1990

[54] FIBER OPTIC POSITION TRANSDUCER

[75] Inventor: Bruce J. Bartholomew, Poway, Calif.

[73] Assignee: General Dynamics Corporation Convair Division, San Diego, Calif.

[21] Appl. No.: 177,579

[22] Filed: Mar. 31, 1988

[51] Int. Cl.$^5$ .............................. G01C 3/08; H01J 5/16
[52] U.S. Cl. ................................. 356/4; 250/227.21; 356/1
[58] Field of Search ........................ 250/227; 356/1, 4

[56] References Cited

U.S. PATENT DOCUMENTS

| | | | |
|---|---|---|---|
| 3,327,584 | 6/1967 | Kissinger. | |
| 4,310,227 | 1/1982 | Zinchuk | 356/4 |
| 4,349,277 | 9/1982 | Mundy et al. | 356/376 |
| 4,357,104 | 11/1982 | Davinson | 356/4 |

*Primary Examiner*—Stephen C. Buczinski
*Attorney, Agent, or Firm*—John R. Duncan; Frank D. Gilliam

[57] ABSTRACT

The disclosure is directed to a distance measurement system for monitoring changes in distances between a source of illumination and a reflective surface. A white light source is directed into a transmit fiber optic element which terminates at a graded index lens (grin) which collimates the light. The light output from the grin lens passes through a single grating or a plurality of different gratings which dispose the white light into a spectrum which is directed to the reflective surface spaced therefrom at an unknown distance. The dispersed light bouncing off the reflective surface enters a receiver fiber optic device connected to a detection system for determining the spaced distance between the grating or gratings and the reflective surface.

15 Claims, 1 Drawing Sheet

FIBER OPTIC POSITION TRANSDUCER

BACKGROUND OF THE INVENTION

This invention relates to electro-optic displacement measuring apparatus and systems and more particularly to new and improved fiber optic displacement measuring apparatus and system having the ability to extend and control the dynamic range of the sensor over that of the prior art and measure changes in gap spacing without relying on absolute intensity measurements.

Various optical measuring systems are taught by U.S. Pat. Nos. 3,327,584; 3,586,400; 3,788,741; 3,940,608; and 4,037,958.

U.S. Pat. No. 3,327,548 by inventor Curtis D. Kissinger teaches the use of optical fibers for conduction of light directed toward and bounced from a reflective surface for distance measurement.

U.S. Pat. No. 3,788,741 by inventor Lester W. Buechler teaches the use of fiber optics to conduct light toward and reflected from an object whose distance from the end of the fiber optic is being measured. The changes in the intensity of the returning light due to focus changes with object movement is detected and related to distance.

U.S. Pat. No. 3,856,400 by inventor Horst Hartman and U.S. Pat. No. 4,037,958 by inventor Horst Schmidt teach the use of a grating in distance measuring optical instruments.

U.S. Pat. No. 3,940,608 by inventor Curtis D. Kissinger teaches fiber optic bundles in a "Y" configuration with one arm of the bifurcated ends of the Y for transmitting a source light and the other bifurcated end receives light from the target displaced from the end of the Y opposite the bifurcated end (second end) an unknown distance which is to be measured. The amount of light returning through the receiver end is related to the distance of the target from the second end of the Y.

None of the prior art references teach dispersing the incident light through a grating creating a spectrum to a reflective surface and detecting the reflected light therefrom at one or several different wavelengths. This feature greatly increases the utility of the fiber optic sensor.

There has not been an optical measuring system which includes a lens and grating added thereto that has an extended dynamic range, responsive control and is not intensity or focus dependent until the emergence of the instant invention.

SUMMARY OF THE INVENTION

In one embodiment of the invention a white light is directed into one end of a fiber optic cable. The opposite end of the fiber optic cable terminates at a grin lens. The output of the grin lens is covered with a grating to disperse the white light into a fan of different wavelength light rays. The plurality of different wave length light rays are directed toward a reflective surface spaced therefrom an unknown distance that is to be measured. Positioned adjacent to the grin lens is a receiving fiber optic cable. It should be understood that because of the different directions of the light rays at the various wavelengths, each ray will strike the reflective surface at a unique angle. Each reflected ray will impact the receiving fiber optic cable at a point determined by the angle of the ray and the distance between the fiber optic cable and the reflective surface. At the opposite end of the receive optic cable a detection system is positioned. The detection system will change the light from the end of the receive optic cable into an electric pulse representative of the gap distance. Two detection schemes can be used to determine the gap distance. In one scheme the detector responds to only one wavelength and the intensity at that wavelength is related to the distance. A second scheme measures the spectrum of the collected light. Because each wavelength travels in a different direction the spectrum shape will change with the gap and the spectral measurement can be used to determine the gap. The advantage of the spectral measurement scheme is that absolute intensity measurements are not required and many measurement difficulties are thereby eliminated. A simple calibration using a measurement standard can establish the accurate gap distance. The accuracy and range of the gap distance measurement are established by the angular dispersion of the grating and the frequency selectivity of the receiving fiber optic device and detection system. The grating line spacing and receiver characteristics can easily be tuned by those skilled in this technology to provide the dynamic range and sensitivity required for a particular application.

A second embodiment of the invention employs multiple gratings with different orientations positioned at the output of the grin lens. The grin lens is surrounded with a plurality of fiber optic receiving devices. In this arrangement each grating will provide a different divergence angle and hence will have a different sensitivity to changes in the gap spacing. A plurality of sensors means, as discussed above, would also be used in this embodiment. Using multiple gratings further enhances the range of sensitivity and the dynamic range of the sensor.

A principle object of this invention is to provide a gap measuring system that is not dependent on changing absolute light intensity or focus to make accurate gap distance measurements.

Another object of the invention is to provide gap measurements that are extremely accurate.

Yet another object of the invention is to provide a gap measuring device that has wide dynamic range capabilities.

Another object of the invention is to provide a measuring instrument that can be tailored for a number of specific applications.

Other features and objects of the invention will be apparent in view of the specific description, taken in conjunction with the drawing Figures, in which:

BRIEF DESCRIPTION OF THE DRAWING FIGURES

DETAILED DESCRIPTION OF THE PREFERRED EMBODIMENTS OF THE INVENTION

Figure 1:
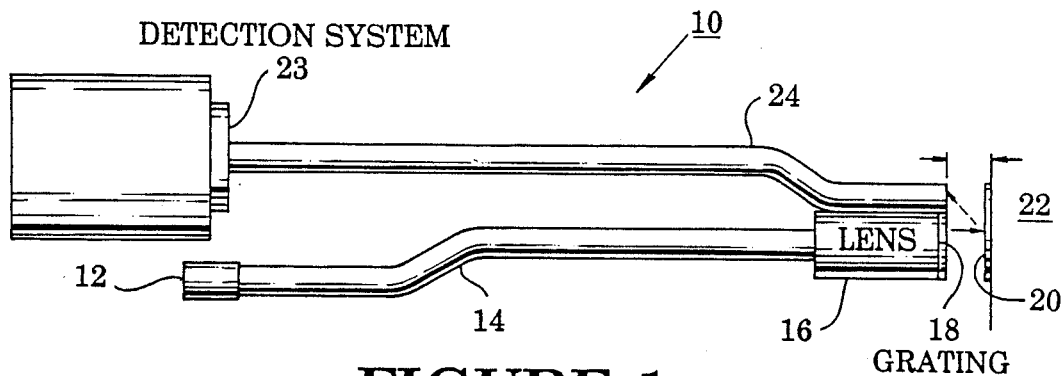
FIG. 1 is a schematic showing of the first embodiment of the present invention.

Referring now specifically to FIG. 1 which depicts a block diagram showing of the first embodiment of the invention 10. A white light source 12 is positioned adjacent to a first end of a fiber optic transmit cable 14. The cable extends a required distance from the white light source and at its opposite end is positioned a graded index (grin) lens 16 which collimates the white light being transmitted through the fiber optic cable. The fiber optic cable can be comprised of a bundle of optic fibers or a single optic fiber depending on the particular run length and/or amount of light required to be transmitted therethrough. Generally a single optic fiber can be used for the purpose hereinafter described. Positioned at the distal end of the grin lens 16 is a grating or gratings 18. The grating or gratings disposes the white light into a spectrum of different wave length lights.

The now dispersed light from the grating or gratings is directed toward a reflective medium 20 mounted on an object 22 (not specifically shown) whose gap distance from the grating or gratings surface it is desired to measure. Obviously the light from the various wave lengths impacting the reflective surface will have a different reflected angle therefrom.

A receive fiber optic cable or single optic fiber 24 is positioned in a location closely adjacent to the transmit fiber optic element under normal expected gap width. The receive fiber optic cable detects the reflected light and carries it to the detection system 23.

The detection system may comprise a single or plurality of photonic sensors 26 such as those commercially available and known as DF series photodiodes manufactured by EG & G Photon Devices, for monitoring the reflected light at specific wavelengths. This signal can be converted into a readable gap distance measurement which can be visually indicated by a suitable display means.

Figure 2:
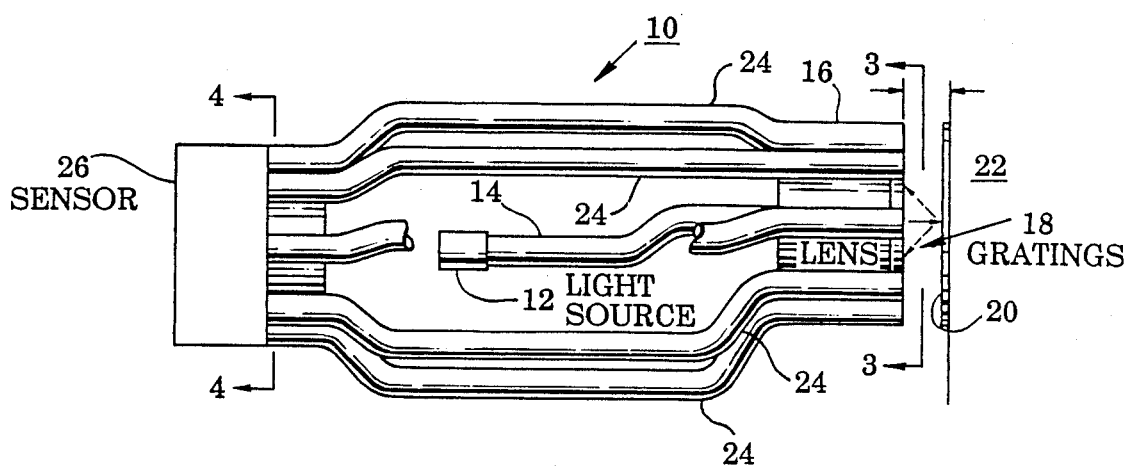
FIG. 2 is a schematic showing of the second embodiment of this invention.
Figures 3, 4:
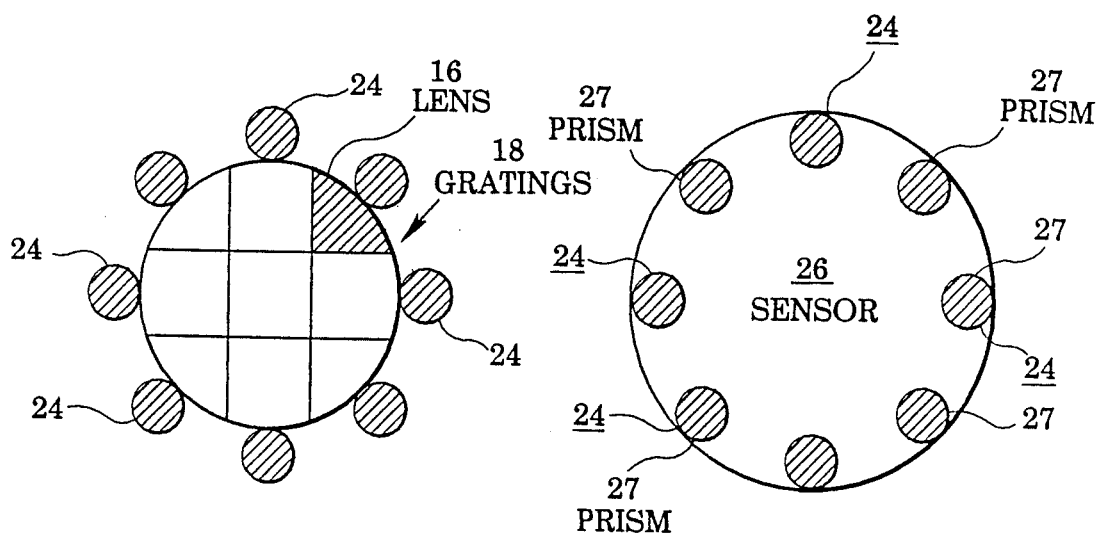
FIG. 3 is an end view showing of FIG. 2 taken along line 2—2.
FIG. 4 is a view taken along line 4—4 of FIG. 2.

Referring now specially to FIGS. 2 and 3 which depicts a second embodiment of the invention. In this embodiment multi-gratings 18 with different orientations and line spacings are positioned at the output of the grin lens 16. The grin lens is surrounded with a plurality of fiber optic receiving fibers 24. In this arrangement each grating will provide a light beam at a different divergence angle and hence will have a different sensitivity to changes in the gap spacing. A plurality of sensor means 26, as discussed above, would also be used in this embodiment.

A second detection method could be employed in either of the two embodiments as shown in drawing FIG. 4. In the second detection method, the collected light present at the end of the receive optic fiber adjacent to sensor 26 represents the entire spectrum of light reflected from the reflected surface. Because each wave length has a different sensitivity the centroid of the spectrum of the collected light will change with mechanical gap spacing. By dispersing the received light with a grating or prism 27 and collecting the light on a detector array, such as the RL series manufactured and sold by EG & G Reticon, the spectrum can be recorded. The recorded spectrum can be processed to extract the gap distance. An advantage in this mode is that the sensor output is independent of external perturbations that effect the total received energy because only relative intensity measurements are required.

It should now be clear that either embodiment of the above described measuring device will provide a very accurate gap distance measurements.

The embodiments of the present invention described herein are the best known current uses of the invention and are described by way of illustration. The scope of the invention is set forth in the appended claims, as it is desired to protect all uses of the invention apparent to those skilled in the art, in addition to those described herein.

What is claimed is:

1. A gap distance measuring device comprising:
   a source of white light;
   a transmit optic cable having an input and output end for receiving said white light at said input end thereof;
   a collimating lens having an input and output end, said output end being positioned for collimating the white light leaving said output end of said transmit optic cable;
   a grating positioned at said output end surface of said collimating lens for changing said white light into a spectrum of different frequency light rays;
   a reflecting surface positioned on an object which has movement relative to a distal surface of said grating lens thereby forming said gap therebetween;
   a receiving optic cable with a receiving end positioned adjacent to said reflective surface for receiving at least one of said different frequency light rays reflected from said reflective surface; and
   detecting means positioned at the opposite end of said receiving optic cable opposite the receiving end for detecting which of said at least one of said different frequency light rays is present.

2. The invention as defined in claim 1 wherein said transmit cable comprises a single fiber.

3. The invention as defined in claim 1 wherein said transmit cable comprises a bundle of optic fibers.

4. The invention as defined in claim 1 wherein said grating means comprises a single grating which has a uniform line spacing.

5. The invention as defined in claim 1 wherein said grating means comprises a plurality of gratings having different line spacings and orientations.

6. The invention as defined in claim 1 wherein said collimating lens is a grading index (grin) lens.

7. The invention as defined in claim 1 wherein said receiving optic cable is a single optic fiber.

8. The invention as defined in claim 1 wherein said receiving optic cable is a bundle of optic fibers.

9. The invention as defined in claim 1 wherein said detected information is converted into a usable signal for establishing an actual value of the length of said gap.

10. The invention as defined in claim 1 wherein said at least one of said different frequency light rays is a single frequency light ray.

11. The invention as defined in claim 1 wherein a different one of said at least one of said different light rays is received by said receiving optic cable at each different gap length within a range of gap lengths.

12. The invention as defined in claim 1 wherein said detecting means comprises a plurality of different light filtering means for identifying which of said at least one of said different frequencies is present at the end of said receiving cable opposite the receiving end thereof.

13. The invention as defined in claim 1 wherein said detection means comprises a plurality of light sensing means each having a sensing means responsive to a different light wave frequency.

14. The invention as defined in claim 13 wherein each of said light sensing means has an output signal which indicates a specific gap length.

15. A method of measuring the gap length spacing between a first and second surface comprising:
    attaching a reflective surface on said first surface;

directing a spectrum of different light frequencies from said second surface toward said reflective surface;

positioning a receiving means on said second surface for receiving at least one of said different light frequencies reflected from said reflective surface at each different gap length between said first and second surfaces;

identifying the frequency of said at least one of said different light frequencies; and transforming that at least one frequency to the actual gap length spacing between said first and second surface.

\* \* \* \* \*